(12) United States Patent
Neubecker et al.

(10) Patent No.: US 11,447,245 B2
(45) Date of Patent: Sep. 20, 2022

(54) DRONE-BASED GOODS TRANSPORTATION

(71) Applicant: Ford Global Technologies, LLC, Dearborn, MI (US)

(72) Inventors: Cynthia M. Neubecker, Westland, MI (US); Somak Datta Gupta, Canton, MI (US); Brad Alan Ignaczak, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 608 days.

(21) Appl. No.: 16/485,944

(22) PCT Filed: Feb. 17, 2017

(86) PCT No.: PCT/US2017/018290
§ 371 (c)(1),
(2) Date: Aug. 14, 2019

(87) PCT Pub. No.: WO2018/151729
PCT Pub. Date: Aug. 23, 2018

(65) Prior Publication Data
US 2020/0017210 A1 Jan. 16, 2020

(51) Int. Cl.
*B64C 39/02* (2006.01)
*E05F 15/70* (2015.01)
*B64F 1/36* (2017.01)

(52) U.S. Cl.
CPC ............. *B64C 39/02* (2013.01); *E05F 15/70* (2015.01); *B64C 2201/128* (2013.01);
(Continued)

(58) Field of Classification Search
CPC .............. B64C 39/02; B64C 2201/128; B64C 2201/141; B64C 2201/208; B64C 2201/201; B64F 1/364
See application file for complete search history.

(56) References Cited

U.S. PATENT DOCUMENTS

| 4,541,226 A | 9/1985 | Nausedas |
| 5,403,143 A | 4/1995 | Ito |

(Continued)

FOREIGN PATENT DOCUMENTS

| CN | 102564543 A | 7/2012 |
| CN | 205707369 U | 11/2016 |

(Continued)

OTHER PUBLICATIONS

Felson Sajonas, "Mercedes-Benz Invests in the Promising Future of Delivery Drones", https://hypebeast.com/2016/9/mercedes-benz-matternet-investment, Nov. 18, 2016.
(Continued)

*Primary Examiner* — Benjamin P Lee
(74) *Attorney, Agent, or Firm* — Brandon Hicks; Bejin Bieneman PLC

(57) ABSTRACT

A container includes a transportation section and a drone section. The drone section has a drone place holder and a door. The drone place holder is accessible when the door is in an open position. The container includes a processor that is programmed to actuate the door to the open position, actuate a drone, fittable in the drone place holder, to fly out of the container, and actuate the drone to transport the container to a destination.

19 Claims, 8 Drawing Sheets

(52) U.S. Cl.
CPC .. *B64C 2201/141* (2013.01); *B64C 2201/208* (2013.01); *B64F 1/364* (2013.01)

(56) References Cited

U.S. PATENT DOCUMENTS

| | | | |
|---|---|---|---|
| 7,344,121 B1 | 3/2008 | Pan | |
| 9,336,506 B2 | 5/2016 | Shucker et al. | |
| 9,522,725 B2 | 12/2016 | Torre | |
| 9,545,852 B2 | 1/2017 | Streett | |
| 9,975,651 B1* | 5/2018 | Eck | B64C 39/024 |
| 10,474,982 B2* | 11/2019 | Winkle | B65D 81/18 |
| 2011/0139772 A1 | 6/2011 | Darney | |
| 2014/0032034 A1* | 1/2014 | Raptopoulos | H04B 7/18506 701/25 |
| 2014/0217230 A1 | 8/2014 | Helou, Jr. | |
| 2015/0120094 A1 | 4/2015 | Kimchi et al. | |
| 2016/0033966 A1 | 2/2016 | Farris et al. | |
| 2016/0101874 A1 | 4/2016 | McKinnon et al. | |
| 2016/0159496 A1* | 6/2016 | O'Toole | B64C 39/024 244/110 E |
| 2016/0185466 A1 | 6/2016 | Dreano, Jr. | |
| 2016/0196756 A1 | 7/2016 | Prakash et al. | |
| 2016/0200438 A1 | 7/2016 | Bokeno et al. | |
| 2016/0207627 A1 | 7/2016 | Hoareau et al. | |
| 2016/0209839 A1 | 7/2016 | Hoareau et al. | |
| 2016/0244187 A1 | 8/2016 | Byers et al. | |
| 2016/0257423 A1 | 9/2016 | Martin | |
| 2017/0039510 A1 | 2/2017 | Ogilvie et al. | |
| 2018/0265222 A1* | 9/2018 | Takagi | B64F 1/32 |
| 2019/0196511 A1* | 6/2019 | Millhouse | B60L 53/31 |
| 2019/0258910 A1 | 8/2019 | Stoman | B65D 51/24 |
| 2020/0390260 A1* | 12/2020 | Romanucci | B64F 1/32 |
| 2021/0016878 A1* | 1/2021 | Perez Barrera | H04W 4/40 |

FOREIGN PATENT DOCUMENTS

| | | |
|---|---|---|
| GB | 2530626 A | 3/2016 |
| JP | 2016153337 A | 8/2016 |
| RU | 2486078 C1 | 4/2012 |

OTHER PUBLICATIONS

Jaclyn Trap, "Drone Delivery is About to Disrupt the Trucking Industry", https://www.trucks.com/category/tech/drone-delivery/, Jun. 21, 2016.

International Search Report and Written Opinion re PCT/US2017/018290 dated May 4, 2017.

CN Notification of First Office Action dated Jul. 29, 2022 (English Translation).

* cited by examiner

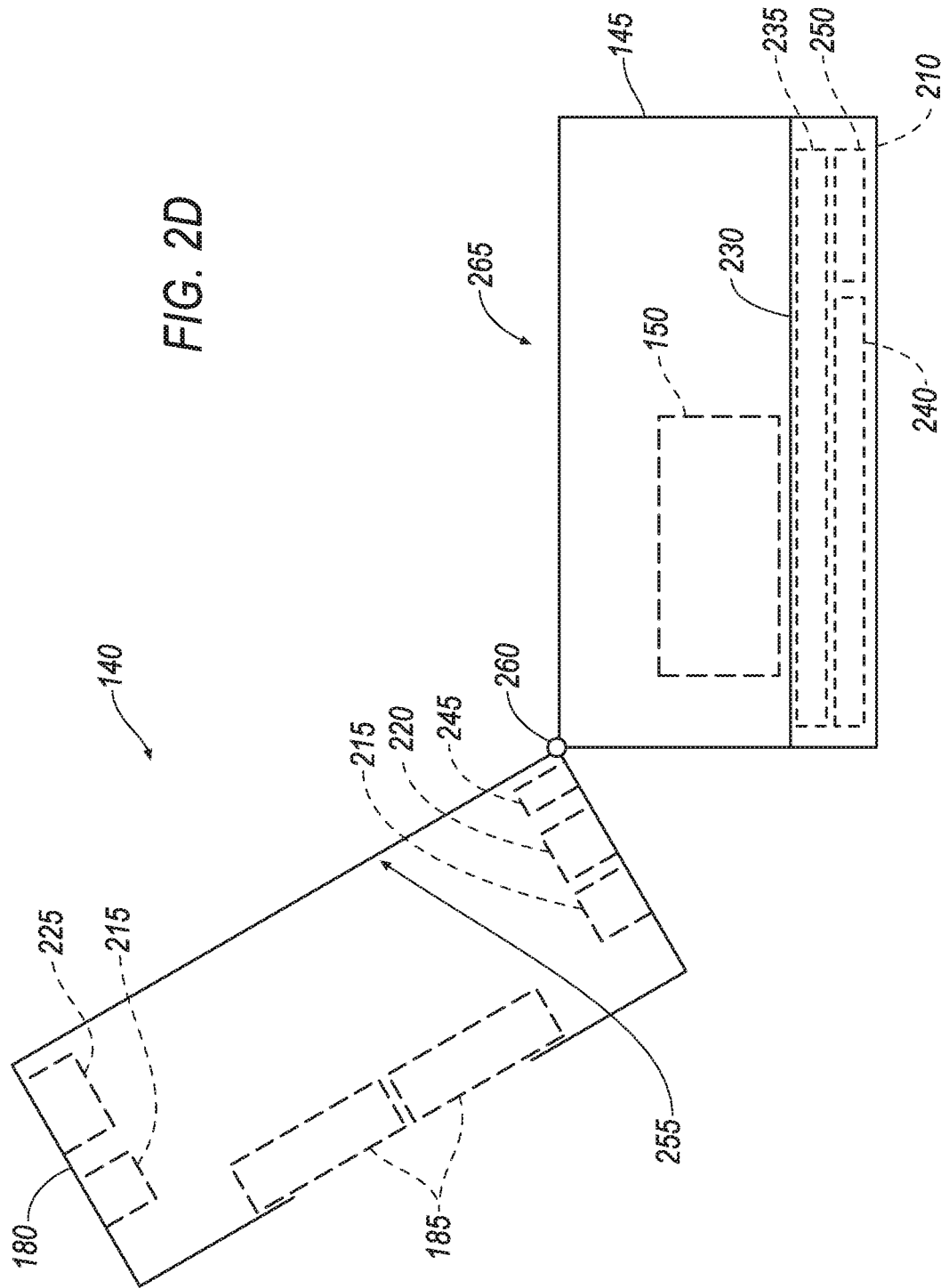

DRONE-BASED GOODS TRANSPORTATION

BACKGROUND

Many aspects of industry and commerce is dependent on the delivery and pick-up of goods. As one example, at a construction site, a construction worker may pick up tools from, e.g., a tools truck, and carry the tools to a respective working location. After finishing a work procedure using the tools and/or after end of a working day, the worker may need to return the tools to the truck. For example, in a large construction site, this may be very time consuming. In another example, a user intending to ship an item, may need to package the item and request a pickup, e.g., via an online request submitted though a website of a shipping company, a phone call to a hotline, etc. There remains an opportunity to improve a delivery and/or pickup of shipping items.

BRIEF DESCRIPTION OF THE DRAWINGS

FIG. 2D shows the container with a transportation section in an open position.

DETAILED DESCRIPTION

Introduction

Figure 1:
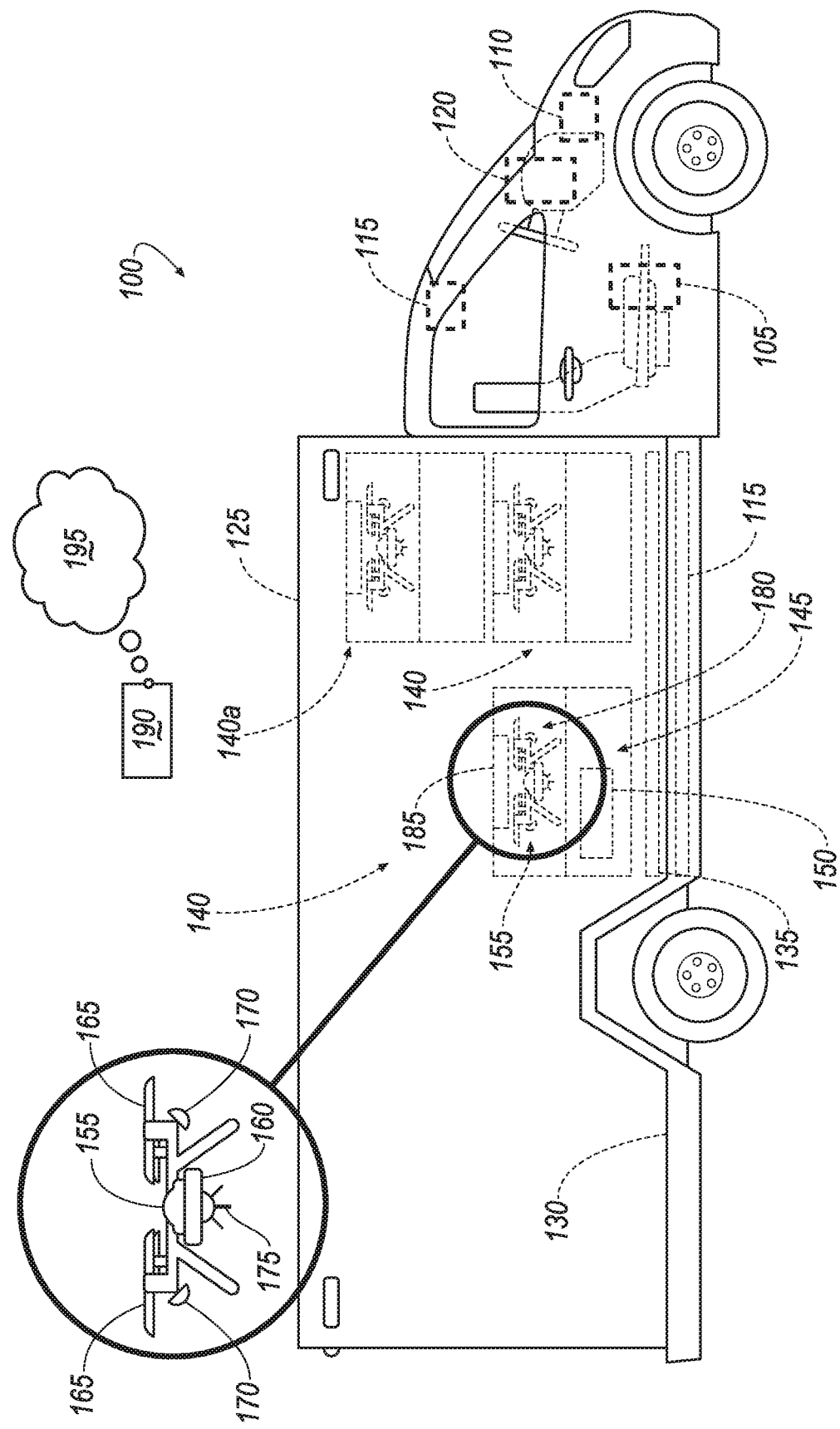
FIG. 1 is a diagram showing a vehicle and multiple containers stored in the vehicle.

With reference to the Figures, wherein like numerals indicate like parts throughout the several views, a transportation container includes a transportation section and a drone section. The drone section includes a drone place holder and a door. The drone place holder is accessible when the door is in an open position. The drone is fittable in the drone place holder, and a processor is programmed to actuate the door to the open position and actuate a drone to fly out of the container. The processor is programmed to actuate the drone to transport the container to a destination.

The processor of the container may be programmed to transport the container to the destination by actuating a drone hook to mechanically couple the drone and the container.

The container may further include a retractable mechanical coupling having a first end attached to the drone place holder and a second end mountable to the drone.

The container may further include a load measuring sensor, wherein the processor is further programmed to determine whether the transportation section is in a loaded state or in an empty state based at least on data received from the load measuring sensor.

The processor of the container may be programmed to determine whether the transportation section is overloaded by determining a weight based on data received from the load measuring sensor, and determining whether the determined weight exceeds a predetermined weight threshold.

The processor of the container may be programmed to prevent a transportation of the container by the drone upon determining that the transportation section is overloaded.

The container may include a rechargeable battery and an inductive charging circuit electrically coupled to the rechargeable battery.

The container may include an electromechanical actuator mechanically coupled to the door, and the processor is further programmed to actuate the door to the open position by actuating the electromechanical actuator.

The container may include a top and a bottom, wherein the transportation section is disposed between the bottom and the drone section, and the drone section is disposed between the top and the transportation section, the door is mounted to the top.

The drone section of the container may be movable relative to the transportation section.

The drone section of the container may be pivotably coupled to the transportation section.

Also disclosed herein is a system comprising a storage apparatus, multiple containers fittable in the storage apparatus, and a processor that is programmed to select one of the containers, and actuate a drone disposed inside the selected container to transport the selected container from the storage apparatus to a destination.

The storage apparatus of the system may include a charging port, and the processor may be further programmed to activate the charging port to charge at least one of the containers.

The storage apparatus of the system may include at least one of a trailer mountable to a truck and a storage area of a vehicle.

The containers of the system may be stackable on top of one another to form a stack.

The processor of the system may be programmed to select the container upon determining that the container is at a top of the stack of the containers in the storage apparatus.

The processor of the system may be programmed to actuate a second drone, fittable in a drone section of a second container outside the storage apparatus, to pick up the second container and transport the second container to the storage apparatus.

The processor of the system may be programmed to actuate the second drone to pick up the second container upon determining that a weight of the second container is less than a weight threshold.

The processor of the system may be programmed to prevent a pickup of the second container upon determining that the second container is overloaded.

Also disclosed herein is a method comprising charging a battery included in a container placed in a storage apparatus, actuating a door of the container to open, actuating a drone, fittable inside the container and mechanically mountable to the container, to fly, and navigate the drone to a destination.

Exemplary System Elements

FIG. 1 illustrates a vehicle 100. The vehicle 100 may be powered in a variety of known ways, e.g., with an electric motor and/or internal combustion engine. Although illustrated as a truck, the vehicle 100 may be any automobile such as a car, a truck, a sport utility vehicle, a crossover vehicle, a van, a minivan, etc. The vehicle 100 may include a computer 105, actuator(s) 110, sensor(s) 115, and a human machine interface (HMI 120). In some examples, as discussed below, the vehicle is an autonomous vehicle configured to operate in an autonomous (e.g., driverless) mode, a partially autonomous mode, and/or a non-autonomous mode.

The computer 105 includes a processor and a memory such as are known. The memory includes one or more forms of computer-readable media, and stores instructions executable by the computer 105 for performing various operations, including as disclosed herein.

The computer 105 may operate the vehicle 100 in an autonomous mode, a semi-autonomous mode, or a non-autonomous mode. For purposes of this disclosure, an autonomous mode is defined as one in which each of vehicle propulsion, braking, and steering are controlled by the computer 105; in a semi-autonomous mode the computer controls one or two of vehicles propulsion, braking, and steering; in a non-autonomous mode, a human operator controls the vehicle propulsion, braking, and steering.

The computer 105 may include programming to operate one or more systems of the vehicle 100, e.g., land vehicle brakes, propulsion (e.g., control of acceleration in the vehicle 100 by controlling one or more of an internal combustion engine, electric motor, hybrid engine, etc.), steering, climate control, interior and/or exterior lights, etc., as well as to determine whether and when the computer 105, as opposed to a human operator, is to control such operations. Additionally, the computer 105 may be programmed to determine whether and when a human operator is to control such operations.

The computer 105 may include or be communicatively coupled to, e.g., via a communications bus of the vehicle 100 as described further below, more than one processor, e.g., controllers or the like included in the vehicle 100 for monitoring and/or controlling various controllers of the vehicle 100, e.g., a powertrain controller, a brake controller, a steering controller, etc. The computer 105 is generally arranged for communications on a communication network of the vehicle 100, which can include a bus in the vehicle 100 such as a controller area network (CAN) or the like, and/or other wired and/or wireless mechanisms.

Via the communication network of the vehicle 100, the computer 105 may transmit messages to various devices in the vehicle 100 and/or receive messages from the various devices, e.g., an actuator 110, an HMI 120, etc. Alternatively or additionally, in cases where the computer 105 actually comprises multiple devices, the vehicle communication network may be used for communications between devices represented as the computer 105 in this disclosure.

The actuators 110 of the vehicle 100 are implemented via circuits, chips, or other electronic and/or mechanical components that can actuate various vehicle subsystems in accordance with appropriate control signals, as is known. The actuators 110 may be used to control vehicle systems such as braking, acceleration, and/or steering of the vehicles 100.

The sensors 115 of the vehicle 100 may include a variety of devices known to provide data via the vehicle 100 communications bus. For example, the sensors 115 may include one or more camera, radar, infrared, and/or Light Detection And Ranging (LIDAR) sensors 115 disposed in the vehicle 100 and/or on the vehicle 100 providing data encompassing at least some of the vehicle exterior. The data may be received by the computer 105 through a suitable interface such as in known. A LIDAR sensor 115 disposed, e.g., on a top of the vehicle 100, may provide object data including relative locations, sizes, and shapes of objects such as other vehicles surrounding the vehicle 100. The computer 105 may receive the object data and operate the vehicle 100 in an autonomous and/or semi-autonomous mode based at least in part on the received object data.

The HMI 120 may be configured to receive user input, e.g., during operation of the vehicle 100. For example, a user may select a mode of operation, e.g., an autonomous mode, by inputting a requested mode of operation via the HMI 120. Moreover, an HMI 120 may be configured to present information to the user. Thus, the HMI 120 may be located in a passenger compartment of the vehicle 100.

The vehicle 100 may include a Global Positioning System (GPS) sensor 115 configured to determine coordinates of a current location of the vehicle 100. The computer 105 may be programed, using known navigation techniques, to identify a route from the current location to a selected destination, as well as display a map and present driving directions to the selected destination via, e.g., the HMI 120.

In addition, the computer 105 may be configured for communicating through a vehicle-to-infrastructure (V-to-I) interface with other vehicles, drones 155, and/or a remote computer 190 via a network 195. The network 195 represents one or more mechanisms by which the computer 105 and the remote computer 190 may communicate with each other, and may be one or more of various wired or wireless communication mechanisms, including any desired combination of wired (e.g., cable and fiber) and/or wireless (e.g., cellular, wireless, satellite, microwave and radio frequency) communication mechanisms and any desired network topology (or topologies when multiple communication mechanisms are utilized). Exemplary communication networks include wireless communication networks (e.g., using one or more of cellular, Bluetooth, IEEE 802.11, etc.), dedicated short range communications (DSRC), local area networks (LAN) and/or wide area networks (WAN), including the Internet, providing data communication services.

The drone 155 is an unmanned aerial vehicle and includes a number of circuits, chips, or other electronic and/or electromechanical components that can control various operations of the drone 155. For instance, the drone 155 may propellers and propeller actuators 165 and fly in accordance with control signals output to the propeller actuators 165. The drone 155 may be outfitted with a navigation system so that the drone 155 can fly to, and hover at, a particular location. The drone 155 may be deployed to, e.g., hover over a container 140, as discussed below. Additionally, the drone 155 may land based on a received landing request. For example, the vehicle computer 105 may actuate the drone 155 propeller actuators 165 to land in a designated area, e.g., a delivery address associated with a shipping item 150.

The drone 155 may include one or more camera sensors 170 that can capture images of an area near the drone 155. The drone 155 may have a housing. The camera sensors 170 may be mounted on the housing, and the drone 155 may include lights mounted to the housing. The drone 155 may be programmed to turn on the camera sensors 170 to capture images of an area below the drone 155. Thus, when hovering over the vehicle 100, the camera sensor 170 may capture images of the vehicle 100 and possibly the area around the vehicle 100. Additionally or alternatively, the drone 155 may include other types of object detecting sensors 170 such as radar, LIDAR, etc.

The drone 155 may include a GPS sensor 170 that provides GPS location coordinates of the drone 155, e.g., to the vehicle computer 105, the drone computer 160, etc. For example, the drone computer 160 may navigate the drone 155 based on the received GPS location coordinates.

As set forth above, the drone 155 may include one or more lights. A computer 105, for example, may be programmed to activate the drone 155 light to illuminate, e.g., an area surrounding the drone 155.

The drone computer 160, computers 105 in vehicles 100, computers 220 in the containers 140, etc. may communicate with one another and with a remote computer 190 via a network 195 that includes one or more telecommunication protocols, e.g., cellular technologies such as 3G, 4G, Long-Term Evolution (LTE), etc., Bluetooth®, Bluetooth Low Energy®, WiFi, etc.

The vehicle 100 may include a storage apparatus 125 for storing and/or transporting one or more containers 140. The transportation apparatus may include a storage area of a truck, as shown in FIG. 1. Additionally or alternatively, the transportation apparatus may include a trailer that is mechanically mountable to a truck, a flatbed truck, a tool inventory in a construction site, a refrigerated trailer, a train cargo car, etc. The containers 140 may be disposed on a floor 130 of the storage apparatus 125 next to one another. Additionally or alternatively, the containers 140 may be stackable on top of one another to form a stack, e.g., a container 145a is placed on top of another container 140.

The storage apparatus 125 may include one or more charging ports 135, e.g., to recharge batteries 225 included in the containers 140 (as discussed with reference to FIGS. 2A-2D). The computer 105 may be programmed to activate the charging port 135 to charge at least one of the containers 140. For example, the batteries may be charged wirelessly using known inductive charging techniques. The charging port 135 may include an inductive charging circuit that supports inductive charging, and is connected to a power source, e.g. a vehicle battery. The computer 105 may be programmed to control a flow of electrical energy that is transferred from the power source to the containers 140. In one example, the computer 105 may be programmed to determine a charging status of the containers 140 disposed in the storage apparatus 125, e.g., based on data received via a wireless communication with the containers 140, and adjust the charging port 135 in accordance to the charging status of the containers 140. For example, the computer 105 may be programmed to shut of the charging port 135 based on charging status of the containers 140. The storage apparatus 125 may include one or more load measuring sensor 115, e.g., mounted underneath the floor 130. The computer 105 may be programmed to determine whether a container 140 is present in an area of the floor 130 based on weight data received from the load measuring sensors 115.

Referring to FIGS. 2A-2D, the container 140 may include a transportation section 145, a drone section 180 with a drone place holder 255 and a door 185. The drone place holder 255 is accessible when the door 185 is in an open position (see FIG. 2B). The container 140 may include a container computer 220 that is programmed to actuate the door 185 to the open position. The container 140 computer 220 may be programmed to actuate a drone 155 that is fittable in the drone place holder 255, to fly out of the container 140. The container computer 220 may then actuate the drone 155 to transport the container 140 to a destination. The destination may include location coordinates of a porch of a house, a working location in a construction site, etc.

Figure 2A:
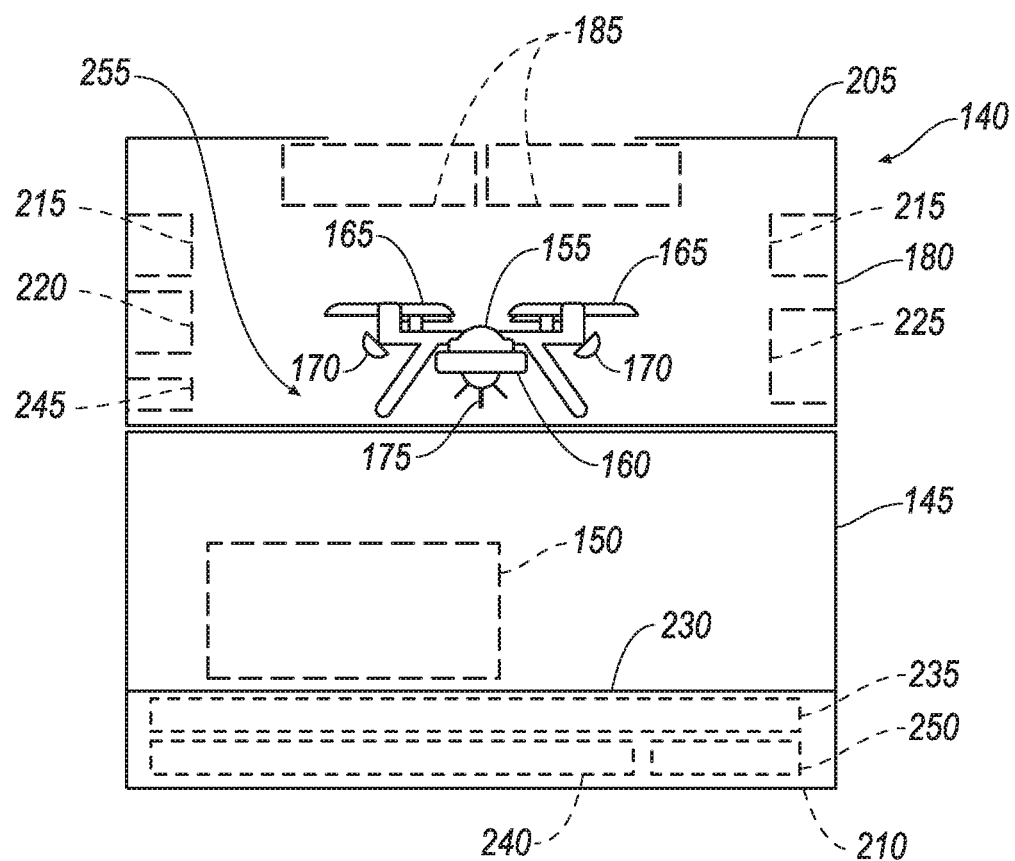
FIG. 2A shows one of the containers of FIG. 1 with a door of the container in a closed position and a drone disposed in the container.
Figure 2B:
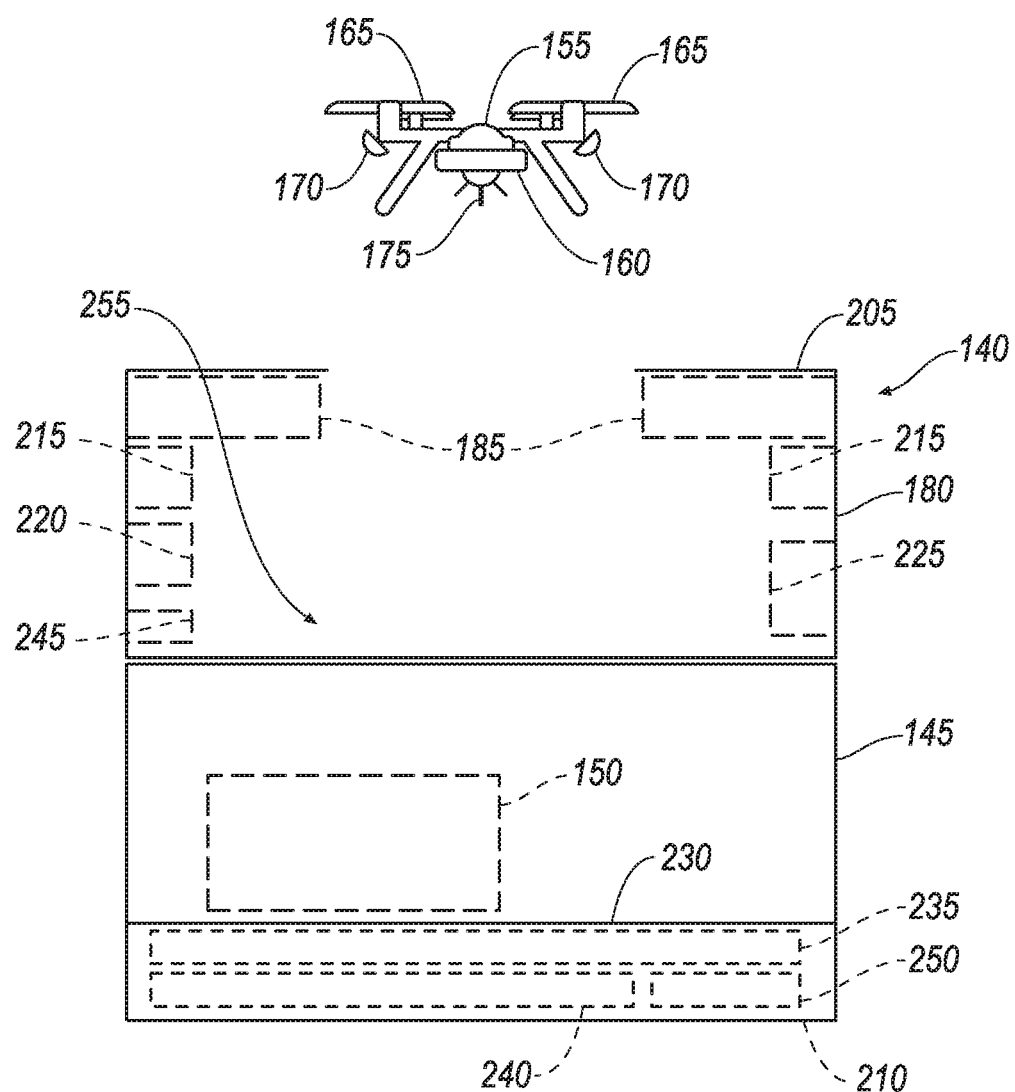
FIG. 2B shows the door in an open position and the drone flying out of the container.
Figure 2C:
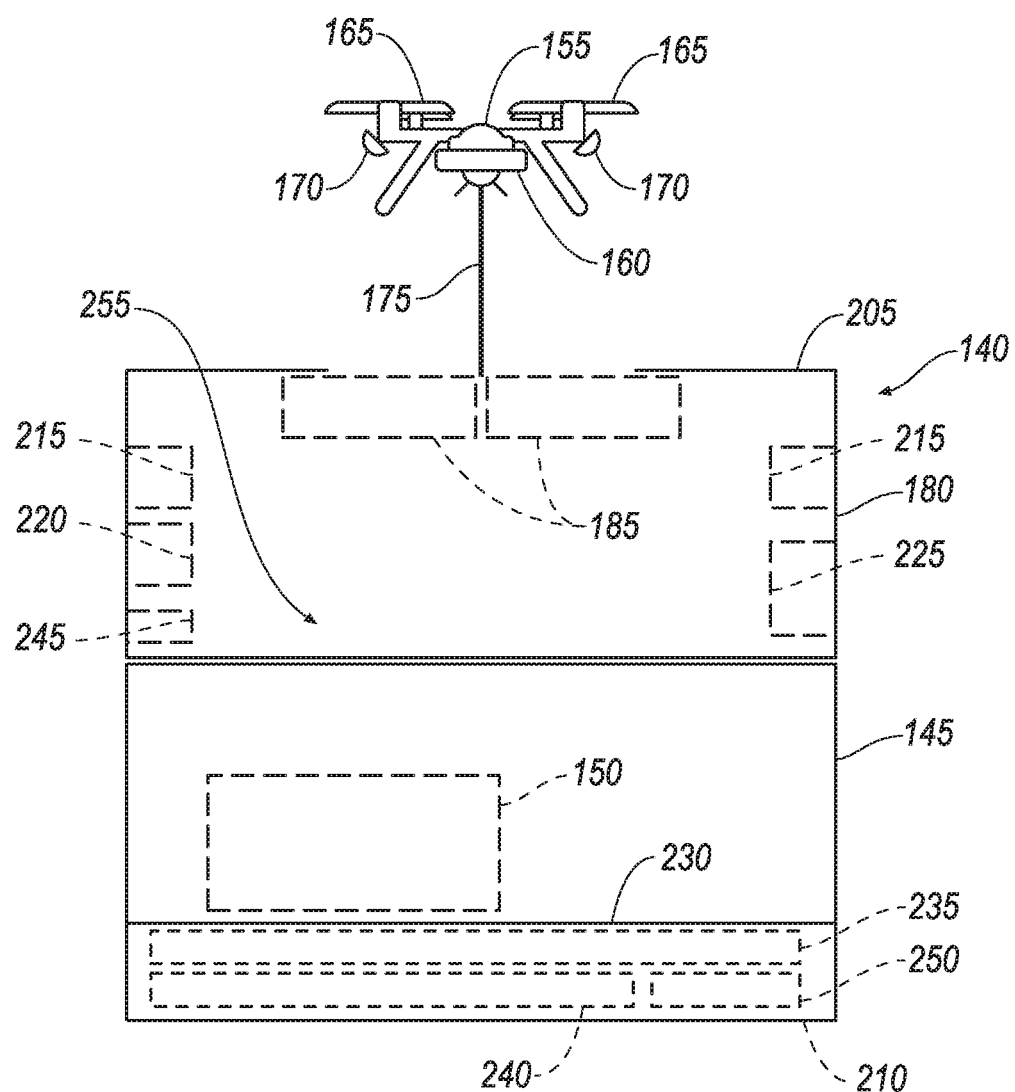
FIG. 2C shows the container with the door in the closed position and the drone carrying the container.

The container 140 may have a solid shape such as rectangular, circular, etc. The container 140 may have various sizes, e.g., small, medium, and large, that may be suitable for various types of goods. The container 140 may have a top 205 and a bottom 210. The transportation section 145 may be disposed between the bottom 210 and the drone section 180. The drone section 180 may be disposed between the top 205 and the transportation section 145, i.e., above the transportation section 145, as shown in FIGS. 2A-2C. Alternatively, although not shown in Figures, the drone section 180 and the transportation section 145 may be disposed next to one another, e.g., both touching the top 205 and the bottom 210.

The drone 155 may be fittable in the drone place holder 255, as shown in FIG. 2A. The drone place holder 255 may have a flat surface so that the drone 155 can take off, i.e., fly, from the drone place holder 255. Additionally or alternatively, the drone place holder 255 may have any other shape so as that the drone 155 is fittable in the drone place holder 255. As stated above, the containers 140 may have various sizes. A large container 140 may hold larger and/or heavier goods compared to a small container 140. Thus, various types of drones 155 may be associated with various types of containers 140. For example, a small drone 155 may be fittable in the drone place holder 255 of a small container 140, whereas, a larger more powerful drone 155 may be fittable in a drone place holder 255 of a large container 140.

The container 140 may include one or more batteries that provide electrical energy for an operation of electrical components, e.g., the container computer 220, included in the container 140. In one example, the batteries(s) may be disposed inside the drone section 180. The batteries may be recharged, e.g., when the container 140 is stored in the storage apparatus 125, e.g., via an inductive coupling of the charging port 135 of the storage apparatus 125 and a charging interface 240 of the container 140. Additionally, the container batteries 225 may provide electrical energy to recharge a battery of the drone 155, e.g., when the drone 155 is disposed in the drone place holder 255. For example, the container computer 220 may actuate a charging circuit included in the container 140 to recharge the drone 155 battery, e.g., using known inductive charging techniques.

The container 140 may include various sensors such as a GPS sensor to identify current location coordinates of the container 140, a load measuring sensor 235 such as a strain gauge to determine a weight of the container 140, a proximity sensor to determine whether the container 140 door 185 is open or closed, a temperature sensor to determine a temperature inside the transportation section 145, etc. The container computer 220 may be programmed to receive information from the sensors. For example, the container computer 220 may be programmed to determine whether the transportation section 145 is in a loaded state, e.g., a shipping item 150 is placed on a surface 230 in the transportation section 145, or in an empty state based at least on data received from the load measuring sensor 235. The load measuring sensor 235 may be disposed at the bottom 210 of the container 140. Thus, the container computer 220 may be programmed to determine whether the transportation section 145 is empty based on information such as a weight of an empty container 140 with and without the drone 155, and information including whether the drone 155 is disposed in the drone place holder 255.

The container 140 may include a wireless communication interface 245 to communicate with, e.g., the drone 155, the computer 105 of vehicle 100, a remote computer 190, etc., via the wireless communication network 195. For example, the container computer 220 may be programmed to receive location coordinates of a destination associated with the container 140, from the computer 105 of the vehicle, via the wireless communication interface 245. In another example, the container computer 220 may be programmed to transmit, via the wireless communication interface 245, current location coordinates of the container 140 to the computer 105 of the vehicle 100, current charging status of the batteries of the container 140, etc.

The container 140 may include an electromechanical actuator 215, e.g., a solenoid, mechanically coupled to the door 185, to open and/or close the door 185. The container computer 220 may be programmed to actuate the door 185 to move from a closed position (see FIG. 2A) to an open position (see FIG. 2B) by actuating the electromechanical actuator 215. Additionally or alternatively, the container computer 220 may be programmed to actuate the door 185 to move from the open position to the closed position.

As shown in FIG. 2C, the container computer 220 may be programmed to transport the container 140 to a destination by actuating a drone hook 175 to mechanically couple the drone 155 and lift the container 140. As another example, the drone 155 may include a retractable mechanical coupling, e.g., a rope, having a first end mountable to the drone place holder 255, e.g., via a loop, and a second end mountable to the drone 155. The container computer 220 may actuate the door 185 to open, actuate the drone 155 to fly out of the drone section 180, actuate the drone hook 175 to mechanically connect the drone 155 and the container 140, and navigate the drone 155 to transport the container 140 to a predetermined destination.

The container computer 220 may be programmed to prevent a transportation of the container 140 by the drone 155 upon determining that the transportation section 145 is overloaded. The container computer 220 may be programmed to determine whether the transportation section 145 is overloaded by determining a weight based on data received from the load measuring sensor 235, and determining whether the determined weight exceeds a predetermined weight threshold. For example, a weight limit of, e.g., 1 kilogram (kg), may be specified for shipping item 150(s) in a small-size container 140. The containers computer 220 may be programmed to determine the weight of the shipping item 150(s) based at least in part on data received from the load measuring sensor 235 and determine that the transportation section 145 is overloaded when the determined weight of the shipping item 150(s) exceeds the weight limit associated with the container 140. The container computer 220 may prevent a transportation of the container 140 by, e.g., preventing a deployment of the drone 155 to transport the container 140, transmitting data including an identifier of the container 140, e.g., a bar code, and data indicating that the container 140 is overloaded. Additionally or alternatively, the container computer 220 may be programmed to transmit data indicating a suitable container size for the shipping item 150. For example, the container computer 220 may determine that a medium size container 140 is suitable for transporting the shipping item 150 and transmit information indicating that a medium size container 140 may be used instead of the small container 140.

As shown in FIG. 2D, the drone section 180 may be movable relative to the transportation section 145. For example, the drone section 180 may be pivotably coupled to the transportation section 145, e.g., via a hinge 260, and form an opening 265. Additionally or alternatively, the drone section 180 may be slideably coupled to the transportation section 145. In one example, a user may move the drone section 180 relative to the transportation section 145 in order to remove, via the opening 265, a delivered shipping item 150 from the transportation section 145 and/or place a shipped item 150 for pickup in the transportation section 145. Additionally or alternatively, the transportation section 145 may include a side door or any other opening that provides access for removing and/or placing the shipping item 150.

In one example, a system may include the storage apparatus 125, multiple containers 140 fittable in the storage apparatus 125, and a computer 105 of the vehicle 100. The computer 105 may be programmed to select one of the containers 140 and actuate a drone 155 disposed inside the selected container 140 to transport the selected container 140 from the storage apparatus 125 to a destination. A drone 155 may be blocked within a drone place holder 255 of a container 140, when another container 140 is placed on top of the respective container 140. Thus, the computer 105 may be further programmed to select the container 140 upon determining that the container 140 is at a top of a stack of the containers 140 in the storage apparatus 125. Additionally or alternatively, the computer 105 may be programmed to prevent a transportation of the container 140 by the drone 155 upon determining that a space between the top 205 of the container 140 and a ceiling of the storage apparatus 125 is less than a threshold distance, e.g., 1 meter. In other words, the computer 105 may be programmed to ensure that the drone can fly out of the container and transport the container without hitting an obstacle such as a ceiling above the container.

The computer 105 may be programmed to pick up containers 140 outside the storage apparatus 125, e.g., from a work station, a porch of a house, etc., and transport the picked up containers 140 to the storage apparatus 125, e.g., in a storage area of a truck vehicle 100. For example, the computer 105 may be programmed to actuate a drone 155 to pick up a container 140 outside the storage apparatus 125 and transport the container 140 to the storage apparatus 125, e.g., to return a previously delivered shipping item 150 to a retailer. The computer 105 may be programmed to determine a location inside the storage apparatus 125, e.g., based on information received from the computer 105 of the vehicle 100. The computer 105 may then actuate the drone 155 to land in the determined landing location. In another example, a container 140 that delivered a shipping item 150 to a destination may be transported back to the storage apparatus 125 upon determining that the container 140 is empty, e.g., the user takes out the delivered shipping item 150. Thus, the computer 105 may be programmed to actuate the drone 155 to pick up the container upon determining that the container is empty, e.g., determining based on information received from the load measuring sensor that a weight of the container is less than a weight threshold. Additionally or alternatively, the computer may be programmed to prevent a pickup of the container upon determining that the container is overloaded (as discussed above). The computer may be programmed to transmit a message to, e.g., the remote computer, including information stating that the weight of the item placed in the transportation section exceeds the predetermined weight threshold. Additionally, the computer may be programmed to actuate the door of the container to open, actuate the drone to land in the drone place holder, and actuate the door to close. Additionally, the computer may be programmed to actuate the drone hook to detach from the container.

The container may include a temperature control unit to, e.g., refrigerate a perishable shipping item. The container computer 220 may be programmed to actuate the temperature control unit 250 to maintain a threshold temperature, e.g., based on temperature data received from the temperature sensor of the container 140, a threshold temperature associated with the shipping item 150, etc. In on example, the container computer 220 may receive the threshold temperature from a remote computer 190, e.g., a computer of a manufacturer/producer of the shipping item 150.

Processing

Figure 3:
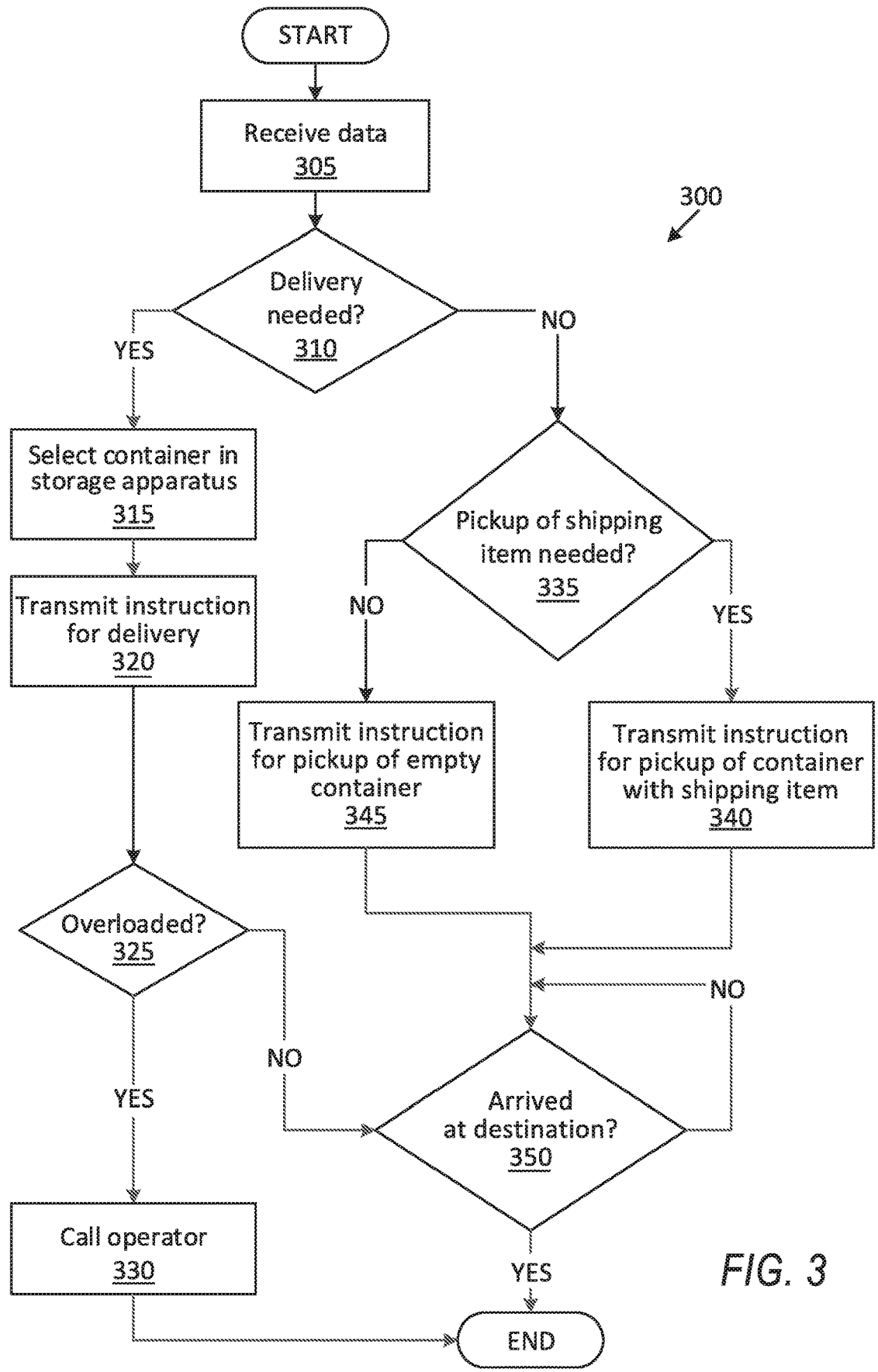
FIG. 3 is a flowchart of an exemplary process for a vehicle to control the containers.

FIG. 3 illustrates an example process 300 for controlling containers 140 by providing instructions to container computers 220. In one example, the computer 105 of the vehicle 100 may be programmed to execute blocks of the example process 300. In another example, a computer associated with a storage apparatus 125, e.g., a tool inventory in a construction site, may be programmed to execute the blocks of the example process 300.

The process 300 begins in a block 305, in which the computer 105 receives data, e.g., from the remote computer 190, including pick up and/or delivery information. In one example, the received information may include an identifier of a container 140 in the storage apparatus 125, location of the container 140 in the storage apparatus 125, and location coordinates of a destination of the container 140. In another example, the received information may include location coordinates of a container 140 for pickup and transport back to the storage apparatus 125. The container 140 for pickup may be an empty container 140, e.g., a user removed the delivered shipping item 150 from the delivered container 140, or a loaded container 140 including an item 150 a user places in the transportation section 145 in order to be picked up.

Next, in a decision block 310, the computer 105 determines whether a delivery of a container 140 from the storage apparatus 125 to a destination is needed, e.g., based on the received data. For example, the computer 105 may determine that a delivery is needed based on current location coordinates of the storage apparatus 125, current location coordinates of the container 140, location coordinates of a destination associated with the container 140. If the computer 105 determines that a delivery is needed, then the process 300 proceeds to a block 315; otherwise the process 300 proceeds to a decision block 335.

In the block 315, the computer 105 selects a container 140 for delivery. For example, the computer 105 may select a container 140 on top of a stack of containers 140 for delivery because the containers 140 underneath are blocked (a drone 155 may not be able to fly out of blocked containers 140). In another example, the compute may select a container 140 for delivery that has a shortest distance between the storage apparatus 125 and a destination associated with the container 140.

Next, in a block 320, the computer 105 transmits instruction to the selected container 140, i.e., a container computer 220 of the selected container 140, for delivery. The computer 105 may transmit instructions specifically to the selected container 140 based on an identifier, e.g., a bar code, of the selected container 140. The instruction may include location coordinates of a destination of the container 140, etc.

Next, in a decision block 325, the computer 105 determines, based on information received from the container computer 220, whether the container 140 is overloaded. For example, the computer 105 receives data indicating that the container 140 is overloaded via a wireless communication between the computer 105 and the container computer 220. If the computer 105 determines that the container 140 is overloaded, then the process 300 proceeds to a block 330; otherwise the process 300 proceeds to a decision block 350.

In the block 330, the computer 105 transmits a message to, e.g., the HMI 120 of the vehicle 100. In one example, upon receiving the message from the computer 105, e.g., on the HMI 120 of the vehicle 100, an operator, a robot, etc., may transport the overloaded container 140 to the destination. Following the block 330, the process 300 ends.

In the decision block 335, the computer 105 determines whether a pickup of a shipping item 150 placed in a transportation section 145 of a container 140 is needed. For example, a user may want to return a purchased item 150 to a retailer of the shipping item 150. The computer 105 may have received information including the pickup location coordinates. If the computer 105 determines that the pickup of the shipping item 150 is needed, then the process 300 proceeds to a block 340; otherwise the process 300 proceeds to a block 345.

In the block 340, the computer 105 transmits an instruction for pickup of the shipping item 150. The instruction may include a destination of the container 140, i.e., location coordinates of the storage apparatus 125, an expected weight of the shipping item 150, etc. The instruction may be transmitted via the wireless communication network 195.

In the block 345, the computer 105 transmits an instruction for pickup of the empty container 140. The instruction may be transmitted via the wireless communication network 195. The instruction may include location coordinates of a destination, e.g., the storage apparatus 125.

In the decision block 350, the computer 105 determines whether the container 140 arrived at the destination. The destination for pickup may be a location inside the storage apparatus 125. In one example, locations inside the storage apparatus 125 may be divided to zones, stacks, etc. that are identified by numbers. The drone 155 may be programmed to determine a location inside the storage apparatus 125, e.g., based on sensor data such as LIDAR data received from drone 155 sensors 170. The destination for delivery may include the location coordinates associated with the delivered container 140. If the computer 105 determines that the container 140 arrived at the destination, then the process 300 ends; otherwise the process 300 returns to the decision block 350, or, returns to the decision block 305, although not shown in the process 300.

Figure 4A:
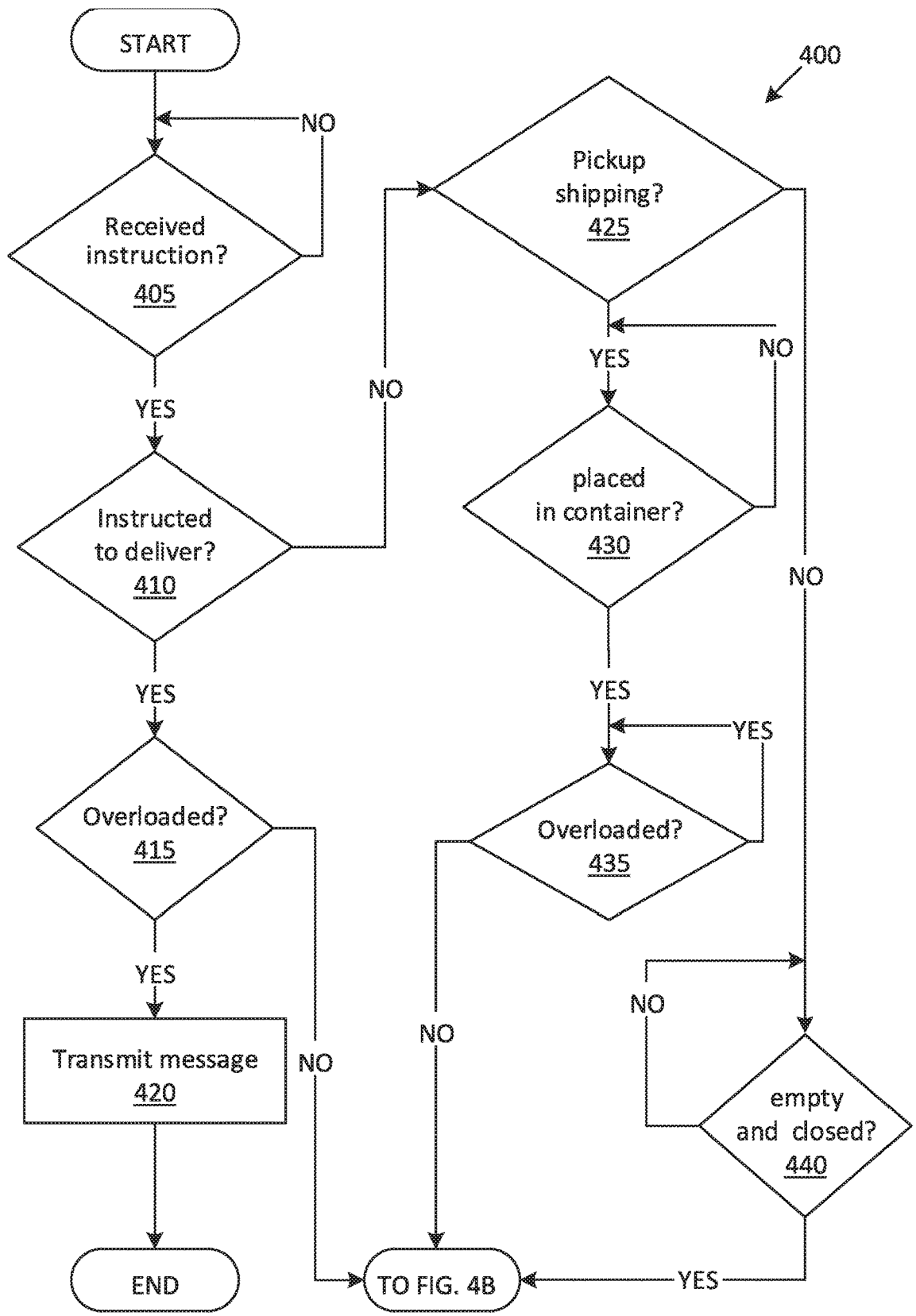
FIGS. 4A-4B are a flowchart of an exemplary process for a container receiving control commands from the vehicle.
Figure 4B:
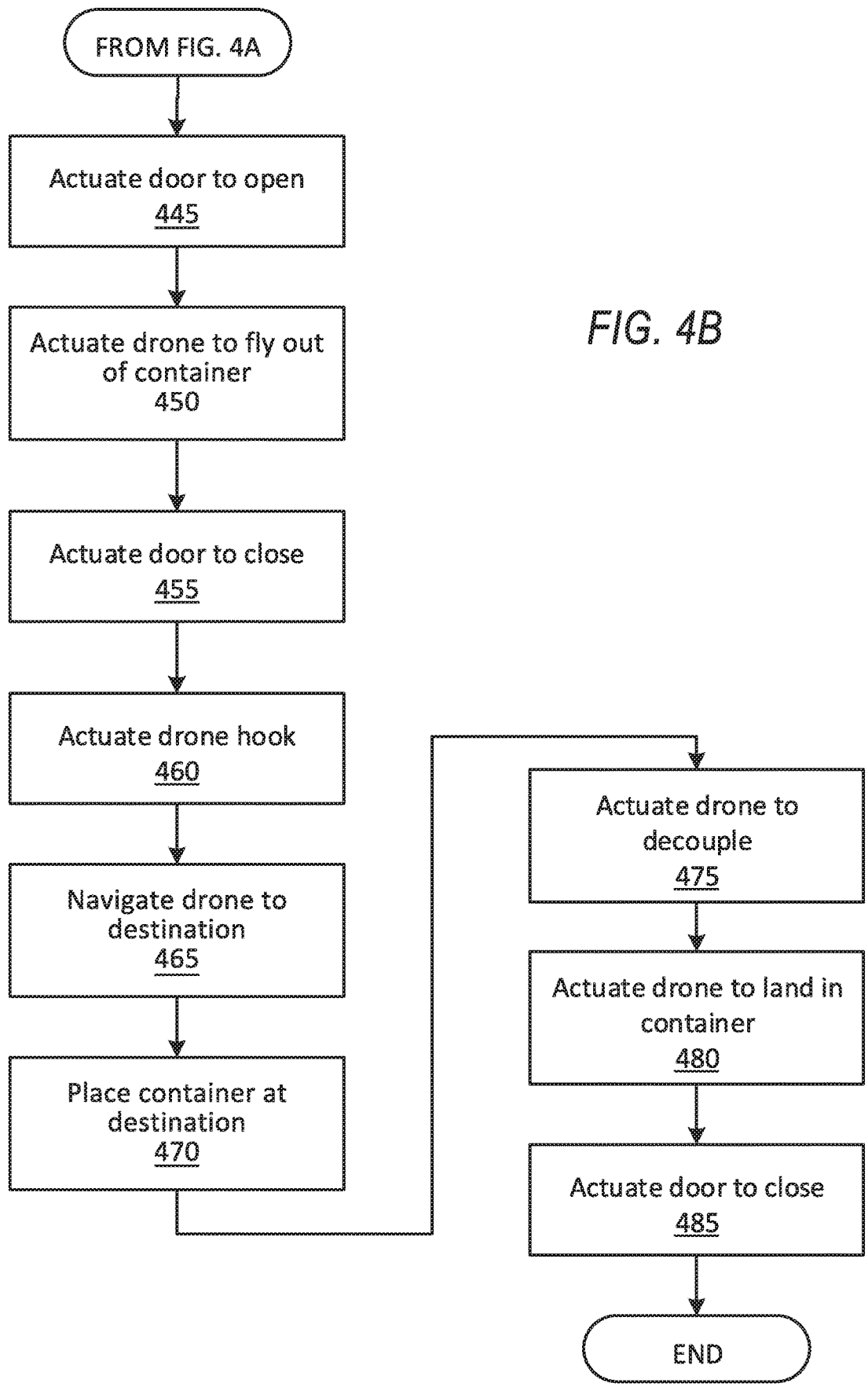

FIGS. 4A-4B illustrate an example process 400 for a container 140 receiving instructions from a computer 105, e.g., the computer 105 of the vehicle 100, the remote computer 190, etc. In one example, a container computer 220 may be programmed to execute blocks of the example process 400.

The process 400 begins in a decision block 405, in which the container computer 220 determines whether an instruction is received, e.g., from the computer 105 of the vehicle 100. For example, an instruction may include an instruction to deliver an item 150, pickup an item 150, or pickup an empty container 140. If the computer 105 determines that an instruction is received, then the process 400 proceeds to a decision block 410; otherwise the process 400 returns to the decision block 405.

In the decision block 410, the container computer 220 determines whether the received instruction includes an instruction to deliver, e.g., from the storage apparatus 125 to a user address. If the container computer 220 determines that an instruction for delivery is received, then the process 400 proceeds to a decision block 415; otherwise the process 400 proceeds to a decision block 425.

In the decision block 415, the container computer 220 determines whether the container 140 is overloaded. In one example, the container computer 220 determines whether a weight of the container 140, e.g., based on data received from a load measuring sensor 235 of the container 140, exceeds a weight threshold associated with the container 140, e.g., based on a size of the container 140. If the container computer 220 determines that the container 140 is overloaded, then the process 400 proceeds to a block 420; otherwise the process 400 proceeds to a block 445 (see FIG. 4B).

In the decision block 425, the container computer 220 determines whether the received instruction includes an instruction to pick up a shipping item 150 stored in a container 140. If the container computer 220 determines that the received instruction includes an instruction to pick up a shipping item 150 is received, then the process 400 proceeds to a decision block 430; otherwise the process 400 proceeds to a decision block 440.

In the decision block 430, the container computer 220 determines whether the shipping item 150 is placed in the container 140, e.g., the transportation container 140 is loaded based on weight information received from a load measuring sensor 235 of the container 140. Additionally, the container computer 220 may determine whether the transportation section 145 of the container 140 is in the closed position. For example, the container computer 220 may determine whether the transportation section 145 is in the closed position based on data received from sensors included in the container 140, e.g., a sensor mounted to the hinge 260 that pivotably couples the transportation section 145 and the drone section 180. If the container computer 220 determines that the container 140 a shipping item 150 is placed in the container 140, then the process 400 proceeds to a decision block 435; otherwise the process 400 returns to the decision block 430.

In the decision block 435, the container computer 220 determines whether the container 140 is overloaded, e.g., based on weight data received from the load measuring sensor 235 of the container 140. Additionally, if the container computer 220 determines that the container 140 is overloaded, the container computer 220 may cause as an action, e.g., actuate an actuator 215 of the container 140 to beep, transmit a message to a user device, e.g., a mobile phone, etc. If the container computer 220 determines that the container 140 is overloaded, then the process 400 returns to the decision block 435; otherwise the process 400 proceeds to the block 445 (see FIG. 4B).

In the decision block 440, the container computer 220 determines whether the transportation section 145 of the container 140 is empty. The decision block 440 may be reached when the received instruction does neither include an instruction for delivery nor an instruction for pickup an item 150. Thus, the received instruction may be an instruction to transport the empty container 140 to, e.g., the storage apparatus 125. The container computer 220 may determine whether the container 140 is empty, e.g., based on data received from the load measuring sensor 235 of the container 140. Additionally, the container computer 220 may determine whether the transportation section 145 of the container 140 is in the closed position, e.g., based on data received from a sensor mounted to the hinge 260 that mechanically couples the transportation and drone section 180. If the container computer 220 determines that the container 140 is empty and the transportation section 145 is in the closed position, then the process 400 proceeds to the block 445.

Turning to FIG. 4B, in the block 445, the container computer 220 actuates the door 185 of the drone section 180 to open, e.g., by actuating the electromechanical actuator 215 of the container 140.

Next, in a block 450, the container computer 220 actuates the drone 155 in the drone section 180 of the container 140 to fly out of the container 140. The container computer 220 may actuate the drone 155 to hover above the container 140 in a predetermined height, e.g., 50 cm above the top 205 of the container 140.

Next, in a block 455, the container computer 220 actuates the door 185 to close, e.g., by actuating the electromechanical actuator 215.

Next, in a block 460, the container computer 220 actuates the drone 155 to attach the hook to the container 140. For example, the drone hook 175 may mechanically couple the drone 155 and the container 140.

Next, in a block 465, the container computer 220 navigates the drone 155 to transport the container 140 to a destination. The container computer 220 may be programmed to navigate the drone 155 based on the location coordinates of the destination, map data, data received from drone 155 sensors 170, etc. Additionally or alternatively, the container 140 may locate a destination such as a porch of a house based on data received from a wireless transmitter placed at the destination.

Next, in a block 470, the container computer 220 actuates the drone 155 to place the container 140 at the associated destination. For example, the received instruction may include a specific stack of containers 140 as the destination within the storage apparatus 125.

Next, in a block 475, the container computer 220 actuates the drone hook 175 to decouple (unhook) the container 140. Thus, the drone 155 and the container 140 may become mechanically decoupled. In one example, the drone 155 hovers above the container 140 during decoupling of the drone 155 and the container 140.

Next, in a block 480, the container computer 220 actuates the drone 155 to land in the drone section 180 of the container 140. For example, the drone 155 may vertically move downward to enter the drone section 180 and land in the drone place holder 255. The drone 155 may determine a completed landing based on data received from drone 155 sensors 170 and/or sensors of the container 140, and deactivates the drone 155 propeller actuators 165.

Next, in a block 485, the container computer 220 actuates the door 185 to close, e.g., by actuating the electromechanical actuator 215 of the container 140.

Following the block 485, the process 400 ends.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A container, comprising:
a transportation section;
a drone section having a drone place holder and a door, wherein the drone place holder is accessible when the door is in an open position; and
a processor, programmed to:
actuate the door to the open position;
actuate a drone, fittable in the drone place holder, to fly out of the container; and actuate the drone to transport the container to a destination.

2. The container of claim 1, wherein the processor is further programmed to transport the container to the destination by actuating a drone hook to mechanically couple the drone and the container.

3. The container of claim 1, wherein the container further includes a retractable mechanical coupling having a first end attached to the drone place holder and a second end mountable to the drone.

4. The container of claim 1, further comprising a load measuring sensor, wherein the processor is further programmed to determine whether the transportation section is in a loaded state or in an empty state based at least on data received from the load measuring sensor.

5. The container of claim 4, wherein the processor is further programmed to determine whether the transportation section is overloaded by determining a weight based on data received from the load measuring sensor, and determining whether the determined weight exceeds a predetermined weight threshold.

6. The container of claim 1, wherein the processor is further programmed to prevent a transportation of the container by the drone upon determining that the transportation section is overloaded.

7. The container of claim 1, further comprising a rechargeable battery and an inductive charging circuit electrically coupled to the rechargeable battery.

8. The container of claim 1, further comprising an electromechanical actuator mechanically coupled to the door, and the processor is further programmed to actuate the door to the open position by actuating the electromechanical actuator.

9. The container of claim 1, further comprising a top and a bottom, wherein the transportation section is disposed between the bottom and the drone section, and the drone section is disposed between the top and the transportation section, the door is mounted to the top.

10. The container of claim 1, wherein the drone section is movable relative to the transportation section.

11. The container of claim 10, wherein the drone section is pivotably coupled to the transportation section.

12. A system, comprising:
a storage apparatus;
a plurality of containers fittable in the storage apparatus; and
a processor programmed to:
select one of the plurality of containers; and
actuate a drone disposed inside the selected container to transport the selected container from the storage apparatus to a destination.

13. The system of claim 12, wherein the storage apparatus includes a charging port, and the processor is further programmed to activate the charging port to charge at least one of the containers.

14. The system of claim 12, wherein the storage apparatus includes at least one of a trailer mountable to a truck and a storage area of a vehicle.

15. The system of claim 12, wherein the containers are stackable on top of one another to form a stack.

16. The system of claim 15, wherein the processor is further programmed to select the container upon determining that the container is at a top of the stack of the containers in the storage apparatus.

17. The system of claim 12, wherein the processor is further programmed to actuate a second drone, fittable in a drone section of a second container outside the storage apparatus, to pick up the second container and transport the second container to the storage apparatus.

18. The system of claim 17, wherein the processor is further programmed to actuate the second drone to pick up the second container upon determining that a weight of the second container is less than a weight threshold.

19. The system of claim 18, wherein the processor is further programmed to prevent a pickup of the second container upon determining that the second container is overloaded.

* * * * *